UNITED STATES PATENT OFFICE.

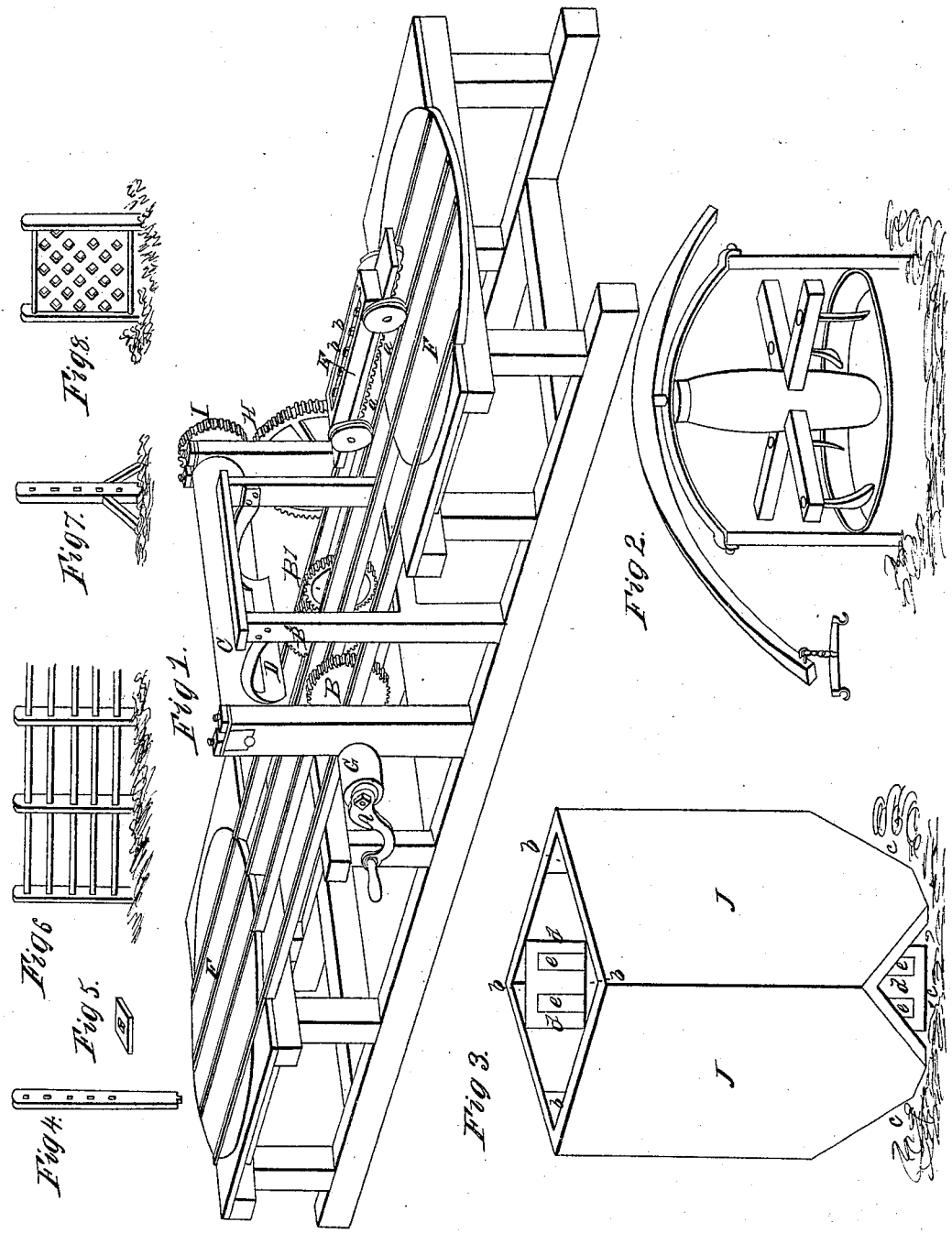

MERCY WRIGHT, OF TULLYTOWN, PENNSYLVANIA.

MACHINE FOR MOLDING AND PRESSING CLAY TO BE APPLIED TO THE CONSTRUCTION OF FENCES, &c.

Specification of Letters Patent No. 2,093, dated May 15, 1841.

*To all whom it may concern:*

Be it known that I, MERCY WRIGHT, of Tullytown, in the county of Bucks and State of Pennsylvania, have invented new and improved machinery or apparatus for manufacturing fence-posts and fences from clay such as is ordinarily used for the making of bricks; and I do hereby declare that the following is a full and exact description thereof.

In the accompanying drawing, Figure 1, is a perspective view of the machine for molding the clay, after it has been tempered, so as to form it into posts, or into panels, or rails, to be applied to the purpose of making fences. Fig. 2, is the mill for tempering the clay preparatory to its being molded by the molding machine. Fig. 3, is a kiln for burning the parts of the fence which have been molded, and Figs. 4, to 8, represent the manner of making and supporting the fence.

Fig. 1, shows a horizontal table, consisting, in part, of two revolving platforms, and of railways for a car to run upon, which car carries the mold. This horizontal table is supported by suitable framing, as shown in the drawings; but which may be varied in its form without interfering with the general plan. G, is the driving shaft, to which any suitable motive power may be applied. It is shown with a winch A, upon it for turning it by hand; but it will in general be driven by animal, water, or steam, power. Upon the driving shaft G, there are three cog-wheels, B, B', and H, which are for the purpose of moving the cars, with their molds, and forcing them under the roller for pressing the clay into them. E, is a car, having under its center a rack $a$, $a$, into the teeth of which the cog-wheels B, B², are to mesh. The wheel B', drives B², which is on a distinct shaft, in order that B, and B², may revolve in reversed directions. B', is smaller than B, and B², to allow the rack $a$, $a$, to pass over it, and engage B². The clay is to be pressed into the mold by a roller C, crossing the machine; the cog-wheel H, meshes into the cog-wheel I, on the end of said roller, and causes it to revolve; its height is such as just to admit the carriage and its mold to pass under it. D, is a scraper for removing the superfluous clay from the mold.

E, is the car, the upper part of which contains, or constitutes, the mold; in the drawing it is represented as adapted to the forming of a mortised post, $b$, $b$, being projecting pieces which form the holes, or mortises. The tempered clay is to be put into this mold, and the machine being in motion, the car is to be moved forward by hand until its rack engages with the cog wheel which is to carry it under the roller C, which presses the clay into the mold, and as the car moves on the scraper D, acts upon the surface, and removes the superfluous clay. The car is then passed on to one of the revolving platforms, the molded piece removed, and fresh clay supplied. The platform may then be turned so as to transport the car to the opposite side of the machine, where it may be operated upon in the same manner; or it may be carried around to the same side, as before. It will be manifest that the form of the mold may be varied, so as to produce simple rails, as shown in Fig. 6, or to form a panel, as shown in Fig. 8. Each panel of this fence may be about three feet in length.

To sustain the posts, I, in general, use what I denominate an anchor, which consists of the same material with the posts, being molded, and baked, in the same way, so as to form a flat block having a hole, or mortise, through its center, which will just admit the post, or a tenon formed on the lower end thereof; one of these is shown at Fig. 5. These anchors may be placed level with the surface of the ground, or sunk below it, to the depth of a foot or two, as may be preferred, and extra braces may be used, as shown in Fig. 7, for sustaining the posts. The anchors may be two feet square, and from 4, to 6 inches in thickness.

The mill for tempering, or mixing, the clay, Fig. 2, is similar to others which have been used for that purpose, and need not, therefore, be described.

The kiln, or furnace, Fig. 3, in which the baking, or burning, is effected, I usually construct of a square form, with stout walls J, J, of bruck, or stone, and in each of the interior angles of this I form a flue, the upper openings of which are seen at $b$, $b$; and into the lower ends of these flues I make openings as at $c$, $c$, by arching, or leaving out a portion of the wall to admit a draft of air. These flues, as represented, are triangular, and the portion $d$, $d$, may be formed of brick, or of iron, and these are to have openings c, c, through them, admitting a free passage of air from them to the interior throughout their whole length. This kiln may be built circular, or in other forms, and the same principle of construction be retained. The fuel used may be of any of the kinds employed for burning brick, but I prefer, and intend, in general, to use anthracite.

Having thus, fully described the nature of my invention, and shown how the same is carried into operation, what I claim therein, and desire to secure by Letters Patent, is—

The manner in which I have constructed, combined, and arranged the machine for the purpose of molding and pressing brick clay, so as to form the parts of fences, as herein set forth; that is to say, I claim the manner in which I have combined the two revolving platforms, the railways, the car with its molds, and the roller and scraper, substantially as herein set forth, so that said parts shall coöperate in effecting the object of their construction, as described.

Witness my hand this 9th day of April 1841.

MERCY WRIGHT.

Witnesses:
REBECCA W. BURTON,
JOSEPH BURTON.